(12) United States Patent
Greiner

(10) Patent No.: US 11,589,128 B1
(45) Date of Patent: Feb. 21, 2023

(54) INTERACTIVE PURCHASING OF PRODUCTS DISPLAYED IN VIDEO

(71) Applicant: Lori Greiner, Chicago, IL (US)

(72) Inventor: Lori Greiner, Chicago, IL (US)

( * ) Notice: Subject to any disclaimer, the term of this patent is extended or adjusted under 35 U.S.C. 154(b) by 0 days.

(21) Appl. No.: 17/012,226

(22) Filed: Sep. 4, 2020

Related U.S. Application Data

(63) Continuation of application No. 62/896,388, filed on Sep. 5, 2019.

(51) Int. Cl.

| | | |
|---|---|---|
| *H04N 7/10* | (2006.01) | |
| *H04N 21/478* | (2011.01) | |
| *H04N 21/472* | (2011.01) | |
| *H04N 21/8545* | (2011.01) | |
| *H04N 21/81* | (2011.01) | |
| *G06F 16/955* | (2019.01) | |
| *H04N 21/431* | (2011.01) | |
| *G06Q 30/0241* | (2023.01) | |
| *G06Q 30/0601* | (2023.01) | |
| *G06F 16/783* | (2019.01) | |
| *H04N 21/44* | (2011.01) | |
| *G06V 20/40* | (2022.01) | |

(52) U.S. Cl.
CPC ... *H04N 21/47815* (2013.01); *G06F 16/7837* (2019.01); *G06F 16/9558* (2019.01); *G06Q 30/0277* (2013.01); *G06Q 30/0623* (2013.01); *G06Q 30/0633* (2013.01); *G06V 20/40* (2022.01); *H04N 21/4316* (2013.01); *H04N 21/44016* (2013.01); *H04N 21/47202* (2013.01); *H04N 21/47217* (2013.01); *H04N 21/812* (2013.01); *H04N 21/8545* (2013.01)

(58) Field of Classification Search
CPC .............. H04N 21/858; H04N 21/812; H04N 21/4316; H04N 21/44
USPC .............................................. 725/32, 34, 60
See application file for complete search history.

(56) References Cited

U.S. PATENT DOCUMENTS

| | | | |
|---|---|---|---|
| 5,655,117 A | 8/1997 | Goldberg et al. | |
| 2016/0292511 A1* | 10/2016 | Ayalasomayajula | ......................... G06V 40/103 |
| 2017/0132659 A1* | 5/2017 | Dirks | ................. G06Q 30/0247 |
| 2018/0152764 A1* | 5/2018 | Taylor | .............. H04N 21/47815 |

* cited by examiner

*Primary Examiner* — Jivka A Rabovianski
(74) *Attorney, Agent, or Firm* — Merchant & Gould P.C.

(57) ABSTRACT

Methods and the systems for providing an interactive, program based product introduction experience are described. In one example, video content may be captured, enriched with product data, and provided on-demand to interactive user devices. Users viewing the content may be presented with supplemental information or resources allowing those users to obtain more information about objects appearing in the video, or purchase products that may be a sociopathic with those objects. The objects appearing in the video may be passively up hearing, rather than explicitly introduced or offered for sale as part of the original video content. However, the supplemental information allows such users to discover and/or purchase new products through interactivity with the video content.

17 Claims, 15 Drawing Sheets

INTERACTIVE PURCHASING OF PRODUCTS DISPLAYED IN VIDEO

CROSS-REFERENCE TO RELATED APPLICATIONS

The present application claims priority from U.S. Provisional Patent Application No. 62/896,388, filed on Sep. 5, 2019, the disclosure of which is hereby incorporated by reference in its entirety.

The present disclosure is directed to methods and systems for generating and providing on-demand interactive content via video and streaming devices.

BACKGROUND

Website shopping provides static images and video of products that are offered for sale. Home shopping networks provide potential customers who view a television program the ability to call or use the Internet to view and order products that are discussed during the television program. These product offerings systems have drawbacks. In the case of web site shopping, the extent of user interactivity is limited because the display of the product relates to the product alone, rather than displaying the product in the context of its use in a room, or commentary by a knowledgeable spokesperson. In the case of home shopping networks, a knowledgeable spokesperson may discuss a product, but that discussion is unnatural because it focuses specifically on sales of the product, rather than discussing the product in the context of other topics. Still further, in the case of home shopping networks, a user often is required to use a different mechanism to actually order a desired product, typically by phone or Internet. Accordingly, improvements in purchasing products that display the products in their useful environments are desirable.

SUMMARY

Generally, the present disclosure relates to methods and systems for enabling consumers to conduct interactive purchasing of products that are offered for sale in moving video.

In a first aspect, a system for generating and providing on-demand interactive content to an audience is disclosed. The system includes a content server including a processor and a memory, the memory hosting a content database, a product database, and an advertising database, the memory further storing instructions which, when executed, cause the content server to receive video content, the video content including a show, such as a talk show, having a plurality of scenes, each of the scenes including a host, one or more guests, and a plurality of objects; ingest the video content into the content database; process the video content to automatically identify an object of the plurality of objects as associated with a product having an associated product record in the product database; define one or more content enrichment actions to be performed during playback of the content, the one or more content enrichment actions including generating an overlay providing product details of the product based on information about the product in the product database, the overlay being displayed in association with the content during playback of a portion of the content during which the object appears; and define one or more advertisements to be displayed in association with the content during playback of at least a portion of the content. The system also includes an application server communicatively connected to the content server and configured to execute instructions which cause the application server to perform the functions of receiving a request from an interactive user device for playback of the video content; in response to the request, obtaining content, product information, and advertisement information form the content server; and generating a content feed to the interactive user device, wherein the content feed allows interaction with the content feed during playback of the video content based on the one or more content enrichment actions.

In a second aspect, a method of creating interactive retail-focused video content is disclosed. The method includes capturing video content of one or more scenes, each of the scenes including a plurality of objects, which may consist of products offered for sale or advertisements. The method may optionally include a cast, such as a host or guests, that appear in the scenes. The method further includes ingesting the video content into a content database. The method also includes processing the video content to automatically identify an object of the plurality of objects as associated with a product having an associated product record in a product database. The method includes defining one or more content enrichment actions to be performed during playback of the content, the one or more content enrichment actions including generating an overlay providing product details of the product based on information about the product in the product database, the overlay being displayed in association with the content during playback of a portion of the content during which the object appears. The method may optionally include defining an advertisement to be displayed in association with the content during playback of at least a portion of the content. The method may further optionally include, upon receipt of a request for the video content, providing the video content, the one or more content enrichment actions, and the advertisement for playback.

In a third aspect, a method of providing interactive retail-focused video content for playback is disclosed. The method includes receiving, from an application executing on a consumer computing device, a request for interactive video content, the request identifying specified video content. The specified video content includes one or more scenes including a plurality of objects. The specified video content may optionally include one or more scenes with a host, and may further optionally include one or more guests. The method includes retrieving the specified video content as well as product data, advertising data, and one or more content enrichment actions to be performed during playback of the specified video content. The method further includes providing interactive video content to the consumer computing device, the interactive video content comprising the specified video content and executing the one or more enrichment actions during playback of the content, the one or more enrichment actions including one or more of displaying an option to purchase a product corresponding to an object of the plurality of objects while the object is displayed during playback of the specified video content; displaying an advertisement associated with an object of the plurality of objects while the object is displayed during playback of the specified video content; and displaying an advertisement associated with a topic of conversation while the topic of conversation is addressed during the talk show as an overlay on a portion of the specified video content.

This summary is provided to introduce a selection of concepts in a simplified form that are further described below in the Detailed Description. This summary is not intended to identify key features or essential features of the claimed subject matter, not is it intended to be used to limit the scope of the claimed subject matter.

DETAILED DESCRIPTION

Figure 1:
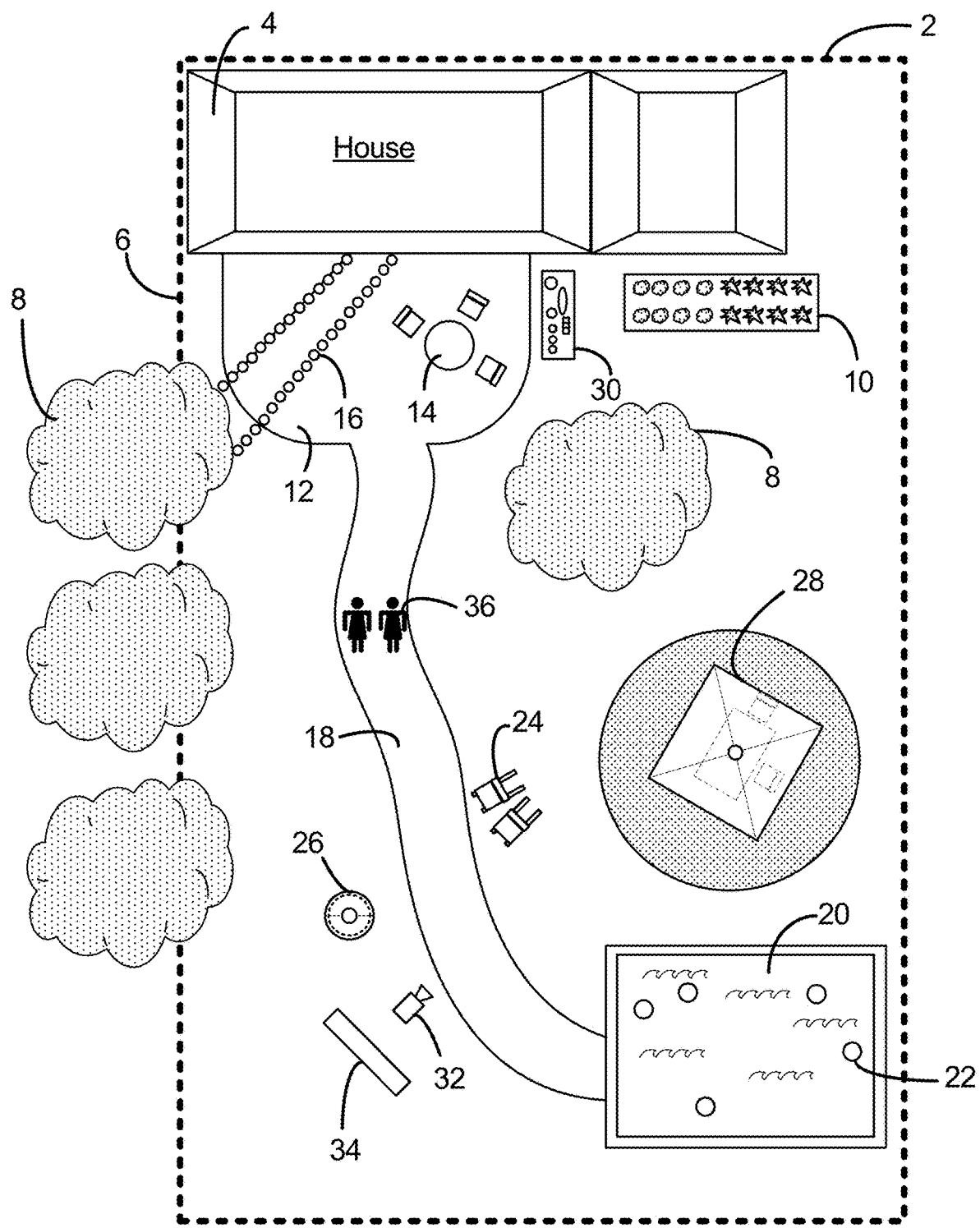
FIG. 1 illustrate a diagram of an environment that may be used to generate content for an on-demand interactive content system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, embodiments of the present disclosure are directed to methods and systems for generating and providing on-demand interactive content to an audience. Generally, this includes creating video data based on an environment that includes objects that are available for sale, performing content enrichment actions on that video data, and serving video data with content enrichment data such as product data, advertising data, and audio data ("enhanced video data") to an audience via interactive devices. The audience, who include consumers, may interact with the enhanced video data and obtain information related to the objects shown in the enhanced video data. The objects include products that are tagged with content enrichment data or other items that are identified in video data to be displayed with additional product data. The audience may purchase the objects by selecting the object during the playback of the enhanced video data.

In example implementations, an environment is created such as a backyard scene. The backyard scene includes one or more objects. In this implementation, the objects are products that are available for sale. A host with an optional guest is recorded in the environment using one or more video cameras. The video cameras record the scene, including the interactions of the host and guest and the objects that are in the environment. The video is uploaded to a network to a content server and stored in a video database. A computer system is used to perform content enrichment actions on the video data. One example of a content enrichment action is to generate an overlay that provides information related to the object, including information related to purchase the object. The enhanced video content is served to an audience via interactive user devices such as a mobile phone, tablet, laptop, personal computer, or television. The user views the enhanced video data via the interactive user device and selects an object to purchase that is depicted in the enhanced video data via an ecommerce server.

Objects may be identified manually or automatically through image recognition, beacon technology, grid layout, and other forms that identify an object. In an example using image recognition, frames are scanned using image recognition technology at selected intervals. If an object appears in a scanned frame, the computer system accesses information about that object and displays product data related to that object on the screen. As the frames advance, the computer system continues to scan the frames to understand where the product is in the screen and to display the product data in a preferred location within the screen. Editors may use video editing software to identify a preferred location to place the product data. As an object exists the screen, or gets to a defined border as provided by the editor, the computer system recognizes that based on the frame screening and stops displaying product data related to that object.

One or more objects may be displayed at a single time within the screen. In one embodiment, two objects are displayed on a single screen at a time interval. In this embodiment, the product data is available to be displayed, but remains hidden, until user selection. The user viewing the video has the option to select one object, for example via touch, and view product data related to that particular object. If a second object is within the same screen during that same time interval, the user may select the second object and product data will appear regarding that second object and the product data for the first object will disappear. Settings may be adjusted to allow product data for multiple objects to be shown simultaneously or automatically without user intervention. User selection may include the use of a touch screen, audible command, mouse, remote control, infrared, motion, or any other means to select the object. A user may also forward, reverse, or pause the video to better interact with the objects displayed on the screen at a particular time.

Another embodiment relates to the use of a beacon or other wired or wireless transmitter that sends signals to the video camera when the object appears in the lens of the video camera. A beacon is placed on an object within a scene. A video camera fitted with a receiver to receive the transmission from the beacon is used to record video data. As the video camera pans towards an object fitted with a beacon, the signal is embedded within the video for the period of time that particular object is in the screen. A user may adjust settings to activate the beacon when the full object is in the screen or when a portion of the object is in the screen. Product data can then be linked to the location within the video data. In this embodiment, a video camera moving across a scene may have multiple objects come into the screen of the video camera. A video camera, fitted with a transmission receiver, will tag the video data when the beacon from the object is within view of the video camera and thus create a tag in the video data that can be updated with product data, advertising data, audio data, and other content enrichment data. That enhanced video data can then be transmitted to users who use interactive devices. The users may select an object as it appears on the screen. Upon selection, content enrichment data may be displayed together with the object. The user may be select the object for purchase. An ecommerce server will serve to complete the purchase.

Another embodiment relates to the use of a stage to create an environment where objects are displayed in a scene on stage. For example, a stage may include two chairs with a table such that a host and guest may converse. Surrounding the cast is a living room set with lamps, tables, sofas, other furniture, and decorations. A grid pattern can be established to identify the location of the objects as shown in the video data. The grid can be used to tag an object with product data. Users interacting with the video that included enhanced video data may select objects and the system will display product data related to that object. Users may select an object for purchase via the system using an ecommerce server. Any combination of elements related to the foregoing may be combined and used with the system.

Another embodiment relates to the use of electronic transmitting tags that are placed on the cast members. Electronic transmitting tags are also placed on or near objects within the environment. As a member of the cast comes near an object that has an electronic transmitting tag, the computer system records the time stamp of the video. The video can then be edited to update the video data with enriched data such as product data, advertising data, and audio data. The tags may also be linked to the video camera to automatically identify the objects with specific frames in the video data.

Referring to FIG. 1, an environment 2 to create video content for a show that includes one or more objects is shown, according to an example embodiment. The environment 2 is a backyard scene that includes a house 4, fence 6, trees 8, garden 10, patio 12 with a table and chairs 14 and string lights 16. The example environment 2 also includes a walkway 18 that traverses the backyard scene to a pool 20 that contains floating orbs 22. The example environment also includes a set of chairs 24, a fire pit 26, a misting umbrella set 28, and a table with food 30. A video camera 32 is set in the environment 2 to record the scene. A physical advertisement 34 is included in the environment 2. A cast 36, which includes a host and a guest in the example embodiment, is within the environment 2.

The environment 2 can be any scene and should not be limited to a backyard scene. Other example environments can include rooms in a home such as a sunroom that includes objects such as billowy curtains, white swinging chairs, Nantucket style tables and planked chairs, charming miniature birdhouses, aromatic diffusers, turquoise pillows and matching rugs. Lobsters, crab cakes, mint topped drinks, and sunflowers may be placed on tables within the environment. Another example environment includes a living room in modern skyscraper with an expansive view of the city outside. Objects within the environment include black leather sofas, marble tables Moroccan pillows, flameless flickering candles, mirrored runners, sleek bowls of Albanian dried fruits and florals. Other objects include state of the art electronics across the walls featuring touch screen features like touch appliances, flat screens, refrigerators and sound systems. The environment can also be created in a studio or soundstage. The objects within the environment may be modified depending on the particular show being recorded. A studio or soundstage environment may be modified to create a living room, sunroom, bedroom, patio, or other home scene, or other environments that are known in the television business.

Objects as used in this embodiment refer to products such as the table and chairs 14, orbs 22, set of chairs 24, and misting umbrella set 28. The exemplary objects depicted in the environment 2 are not intended to be limiting and any product could be placed in the environment 2. Beyond products, objects also include any other physical item that is placed in the environment, such as a physical advertisement including a banner or light board. Objects are used to trigger additional content to be displayed on the screen as described in more detail herein.

According to the example embodiment, the environment 2 presents a scene that is used to record video content for a television or streaming show such as a talk show. The video camera 32 records the actions of the cast 36 as the cast 36 interacts in the environment 2 and, optionally, the objects therein. The objects are placed within the environment 2 in such a manner as to be in the line of sight of the video camera 32 so that as the video camera 32 records the show, the objects appear in the video content. The cast is not required to be a part of the scene. B-roll, which is video created to be used in connection with a television show, is one example where the cast would not be included. Alternatively, the video camera 32 may be used to record a scene based on the environment 2 with objects.

As used herein the video camera 32 can be any range of devices that record video, and preferably audio. Example video cameras include studio cameras, field cameras, camcorders, mobile phones, and tablets. An example digital camera that may be used is the DIGI SUPER 8611 from Canon. The video camera 32 may be digital or analog and may or may not be connected to a network. In the example embodiment, one video camera is used, but any number of video cameras may be used. Multiple camera products (MCP) generally uses multiple studio cameras that are linked to a control unit.

The video camera 32 creates video content, which includes video and audio. The video content may be uploaded to a network via network capabilities of the video camera 32, using a computer, or using a device such as an adapter that can link to the video camera 32 and connect either wirelessly or via wire to a network connection.

Figure 2:
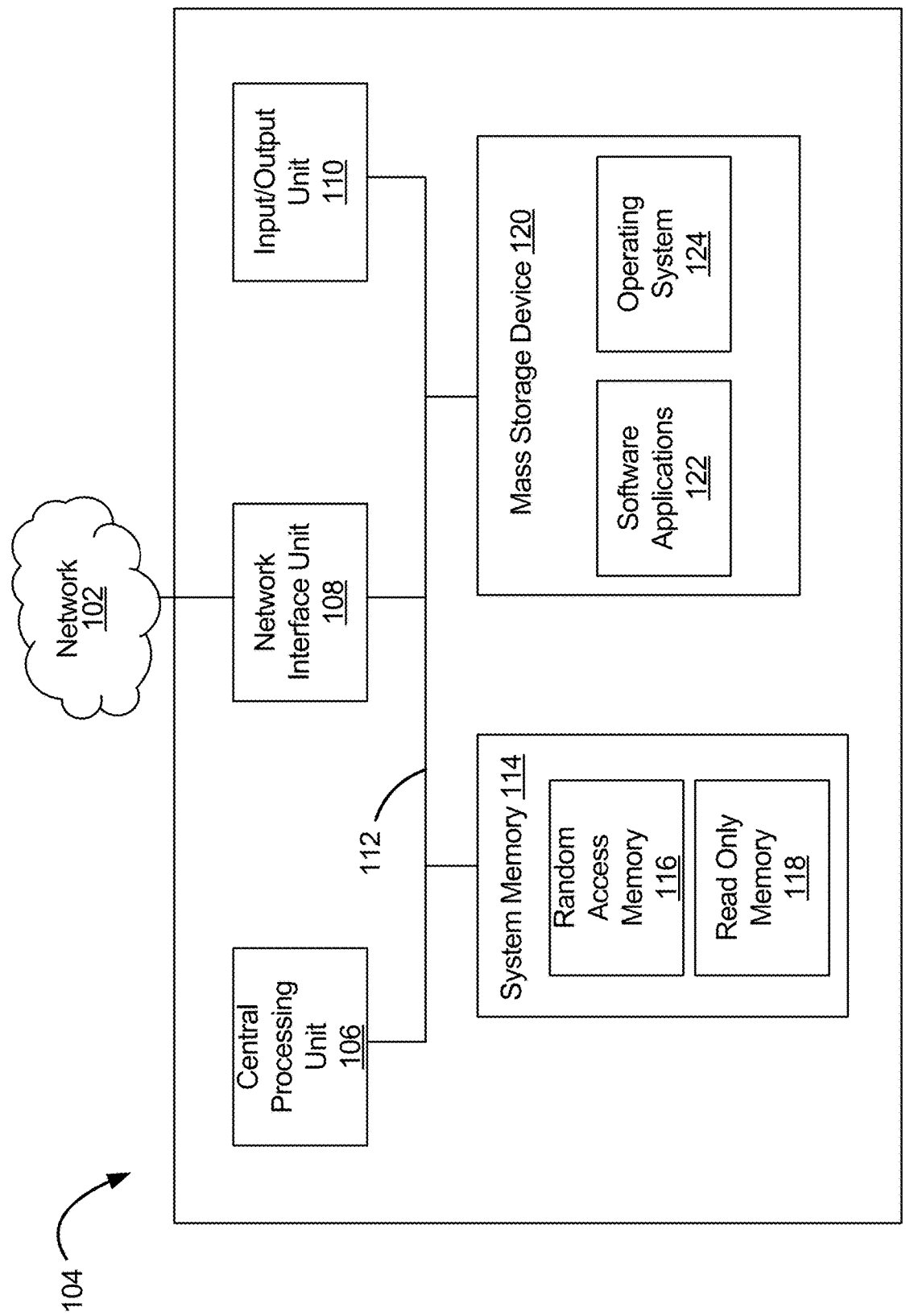
FIG. 2 illustrates an example block diagram of a computing system useful for implementing the on-demand interactive content system.

Referring now to FIG. 2, an example block diagram of a computing system 104 is shown that is useable to implement aspects of the on-demand interactive content system described herein. In the embodiment shown, the computing system 104 includes at least one central processing unit ("CPU") 106, a system memory 114, and a system bus 112 that couples the system memory 114 to the CPU 106. The system memory 114 includes a random access memory ("RAM") 116 and a read-only memory ("ROM") 118. A basic input/output system that contains the basic routines that help to transfer information between elements within the computing system 104, such as during startup, is stored in the ROM 118. The computing system 104 further includes a mass storage device 120. The mass storage device 120 is able to store software instructions and data.

The mass storage device 120 is connected to the CPU 106 through a mass storage controller (not shown) connected to the system bus 112. The mass storage device 120 and its associated computer-readable storage media provide non-volatile, non-transitory data storage for the computing system 104. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 106 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 104.

According to various embodiments of the invention, the computing system 104 may operate in a networked environment using logical connections to remote network devices through a network 102, such as a wireless network, the Internet, or another type of network. The computing system 104 may connect to the network 102 through a network interface unit 108 connected to the system bus 112. It should be appreciated that the network interface unit 108 may also be utilized to connect to other types of networks and remote computing systems. The computing system 104 also includes an input/output controller 110 for receiving and processing input from a number of other devices, including a touch user interface display screen, or another type of input device. Similarly, the input/output controller 110 may provide output to a touch user interface display screen or other type of output device.

As mentioned briefly above, the mass storage device 120 and the RAM 116 of the computing system 104 can store software instructions and data. The software instructions include an operating system 124 suitable for controlling the operation of the computing system 104. The mass storage device 120 and/or the RAM 116 also store software instructions, that when executed by the CPU 106, cause the computing system 104 to provide the functionality discussed in this document. For example, the mass storage device 120 and/or the RAM 116 can store software instructions that, when executed by the CPU 106, cause the computing system 104 to receive and analyze inventory and demand data.

Figure 3:
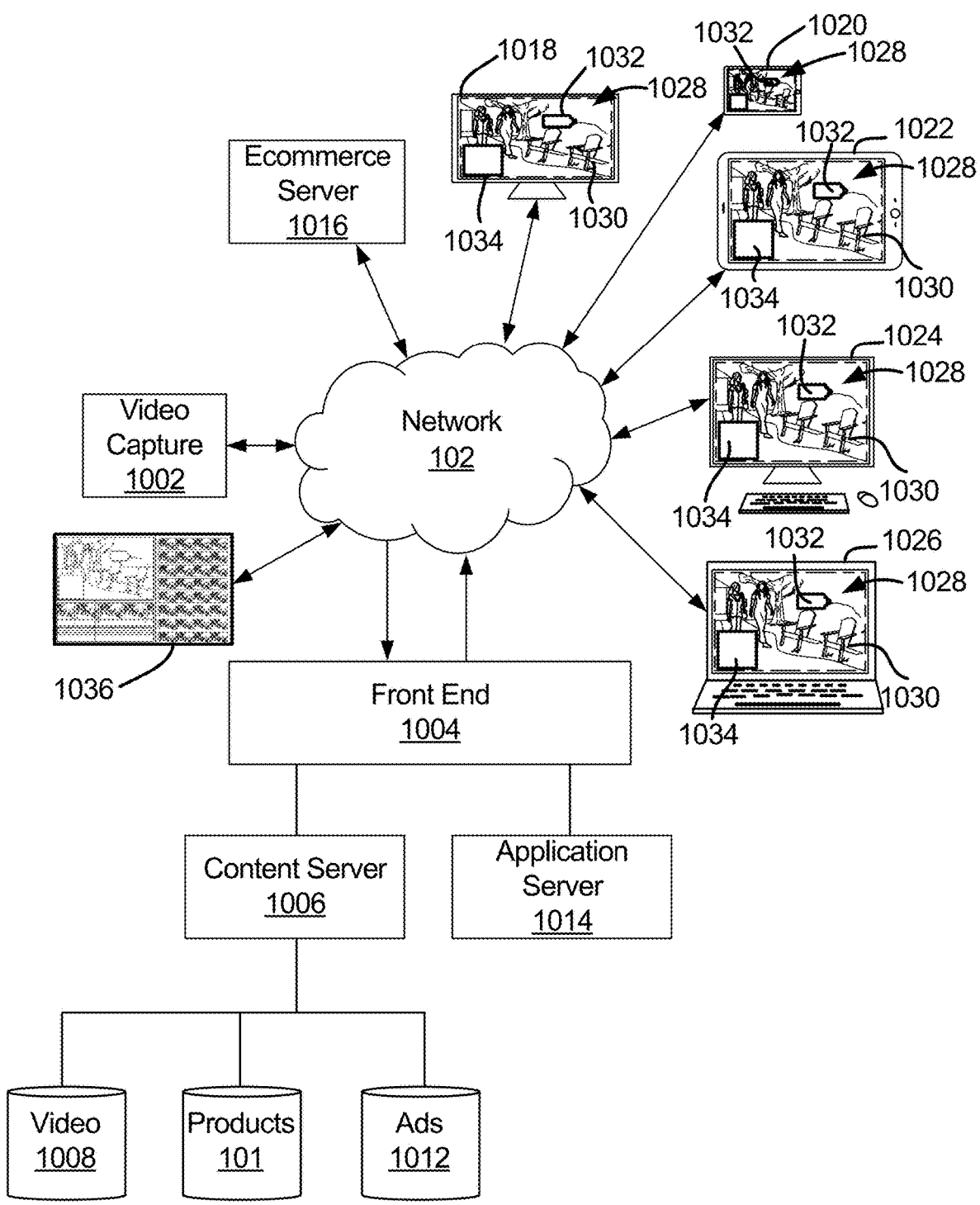
FIG. 3 illustrates a system for generating and providing on-demand interactive content to an audience, and in particular content related to objects available for purchase, according to an example embodiment.

FIG. 3 illustrates a system for generating and providing on-demand interactive content to an audience, and in particular content related to objects available for purchase, according to an example embodiment. The network 102 described in FIG. 2 is connected to a video capture system 1002. The video capture system 1002 may be a general purpose computer as set forth in FIG. 2. In one embodiment, the video data captured from the video camera 32 is uploaded to the video capture system 1002. The video capture system 1002 is connected to the network 102. The network 102 is connected to a front end system 1004. The front end system may be directly access and interacted with by a user to receive or utilize back end capabilities of the system. For example, the front and system 1004 may provide an accessible interface at which or may route traffic from various user devices (described below) to an application server 1014, which may access various content from the content server 1006 for delivery to the respective user devices.

The front end system 1004 can be a software application or the combination of hardware, software, and network resources. The front end system 1004 is connected to a content server 1006, which includes a video content database 1008, a product information database 1010, and an advertising information database 1012. The front end 1004 is also connected to an application server 1014.

A video editing computer 1036 is connected to the network 102. The video editing computer 1036 can have the structure of the computer system 104 set forth in FIG. 2. The video editing computer 1036 interacts with the video data stored on the video database 1008, the product data stored in the product database 1010, and advertising data stored in the advertising database 1012.

Users may interact with the video data and any content enrichment data on the on-demand interactive content system set forth in FIG. 3 through the use of an interactive device such as a television 1018, a mobile phone 1020, a tablet 1022, a desktop computer 1024, or a laptop computer 1026. These devices are exemplary and not intended to be limiting on the definition of an interactive device. The interactive devices may display video data 1028, including video data 1028 enhanced with product data 1032, advertising data 1034 and other data. Video data 1028 enhanced with product data 1032 and advertising data 1034 is displayed on the interactive devices in FIG. 3. The video content 1028 is enhanced with the product data 1032 and advertising data 1034 using the video editing computer 1036. In the example implementations, the various user devices described herein may access enriched video content from the application server 1014, which can, in response to requests from the user devices, deliver content from the content of server 1006. The content can include, for example, video content from the video content database 1008, products content from the products database 1010, and advertisements from the ads database 1012.

An ecommerce server 1016 is connected to the network 102. The ecommerce server may be configured as the computer system 104 set forth in FIG. 2. The ecommerce server 1016 operates the ecommerce functions, including website and purchase options. In example embodiments, the ecommerce server 1016 may be associated with the entity providing content via the content server 1006 and application server 1014. In other embodiments, the ecommerce server 1016 may represent a third party online retailer.

Figure 4:
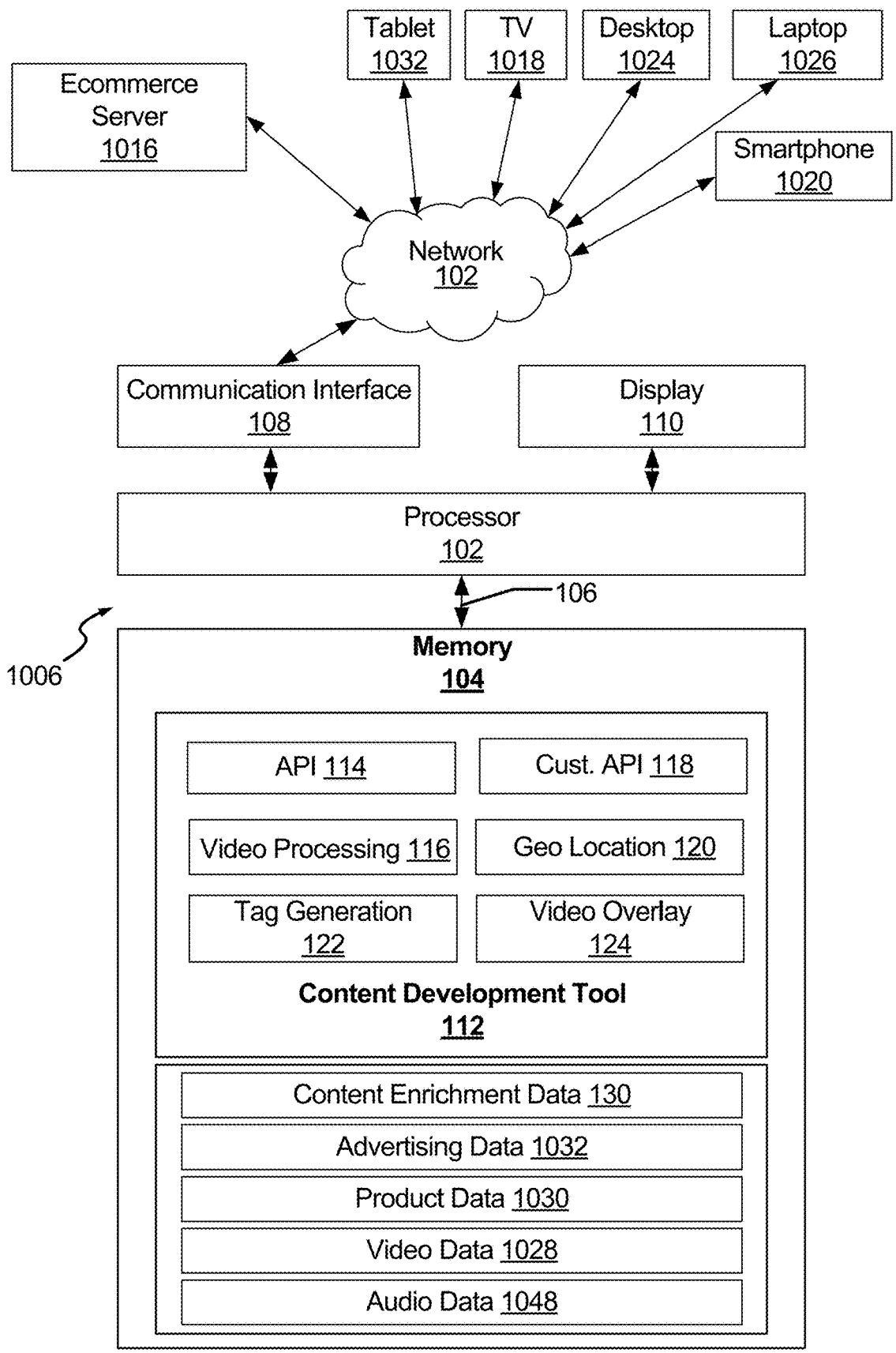
FIG. 4 illustrates a content management portion of a system for generating and providing on-demand interactive content to an audience.

FIG. 4 illustrates the operation of the content server 1006 as set forth in FIG. 3 together with the network 102, ecommerce server 1016, and interactive devices, including the television 1018, mobile phone 1020, tablet 1022, desktop computer 1024, and laptop computer 1026. FIG. 4 illustrates an embodiment of the content server 1006 of FIG. 3 in connection with the network 102 without optional front end 1004. The content server 1006 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores a content development tool 112, discussed in further detail below. The content server 1006 can also include a communication interface 108 configured to receive and transmit data, for example to access data in an external database, or to provide product details to interactive devices such as the tablet 1030. Additionally, a display 110 can be used for viewing product details generated by the content development tool 112.

In various embodiments, the content development tool 112 performs a process including enriching video data 1028 using content enrichment data 130 such as advertising data 1032, product data 1030 and audio data 1048.

In one sample embodiment, the content development tool includes an API 114, a video processing subsystem 116, customer API 118, geo location 120, tag generator 122, and video overlay 124.

The API 114 provides an access interface at which content may be received, for processing by the content development tool 112. The video processing subsystem 116 can receive the video content and process the video content to identify one or more objects within the video content. The objects may be, for example, any object that appears in one or more scenes of the video content and may be objects of interest or topics of discussion by the cast. In some instances, the objects may be products that have corresponding product listings included in the product data 1030. Accordingly, metadata may be applied by the video processing subsystem 116 to identify the associated objects and products, and to generate content enrichment data 130 which may define actions to be taken when the video content is played back that may enrich that video content. Such actions may include, for example, displaying an overlay of product information based on information in the product data 1030 associated with the product that correlates to the object.

In some embodiments, a customer API 118 may allow a user device to access content. The customer API 118 may receive requests, for example from an application server 1014 or directly from a user device, and may respond with video content for playback as well as one or more content enrichment actions to be executed in combination with playback of the video content.

The geo location system 120 may be used to identify a specific location that is displayed in a scene, or alternatively, a specific location of a user device that is used to request playback. In the embodiments in which the geo location system 120 identifies a specific location of an object in the scene, the system may include one or more beacons used to identify relative positioning of objects and individuals within a confined geographic location. Accordingly, the geo location system 120 may be used to further apply metadata to the video content.

The tag generator 122 generates one or more tags that are displayable in combination with the video content. In example embodiments, the video processing subsystem 116 may identify one or more objects in video content, and can identify products that may be associated with those objects. The tag generator 122 can in turn define supplemental content that may be displayable in combination with the video content. The display may include a pop-up overlay providing supplemental content (e.g., text or image content) that can be displayed in proximity to the object, and may include supplemental information about the product that is associated with the object. The video overlay 124 is then responsive to access via the customer API 118 from user devices, and can serve the video content and any related content enrichment data, including tag content, for display alongside or over the video content when requested by a user device.

In one embodiment, as described in more detail below, the video camera 32 may be used to take close ups of each object in the scene prior to or after recording the content. The close ups of the objects may be used to image match the objects to the product data, advertising data, audio data, and other content enrichment data. After the video data 1028 is collected using the video camera, the computer system (e.g., the video processing subsystem 116) uses image recognition software to match each object that was subject to a close up with the object as shown in the video data.

In the embodiment shown, the content development tool 112 receives a combination of the advertising data 1048 from the advertising database 1012, the product data 1030 from the product database 1010, and the video data 1028 from the video database 1008. Content enrichment data 130 may be stored in any of the video database 1008, product database 1010, or advertising database 1012, or separately from those databases. While this embodiment separates out data into different databases, one of ordinary skill would understand that the data could be includes in a different combination of databases.

The video data 1028 is generated from the video camera 32 set forth in FIG. 1. In one sample embodiment, the video camera 32 is fitted with a receiver that receives signals from a beacon. Beacons may be placed on objects within the scene, such as the chairs 24. As the video camera 32 pans towards the chairs 24, the beacon on the chairs activates the video camera 32 to tag the video with a tag that identifies the specific beacon on the chairs. That beacon can be linked to particular product data, advertising data, and audio data.

The network 102 may also include an ecommerce server 1016 or communicate with an ecommerce server 1016 remote from the network 102. The block diagram of a computing system 104 may be used to implement aspects of the ecommerce server described herein. The ecommerce server 1016 comprises a system configures to facilitate the buying or selling of products over a network. The ecommerce server 1016 can be local to or included in the network 100 such as the extranet of an ecommerce entity.

Figure 5:
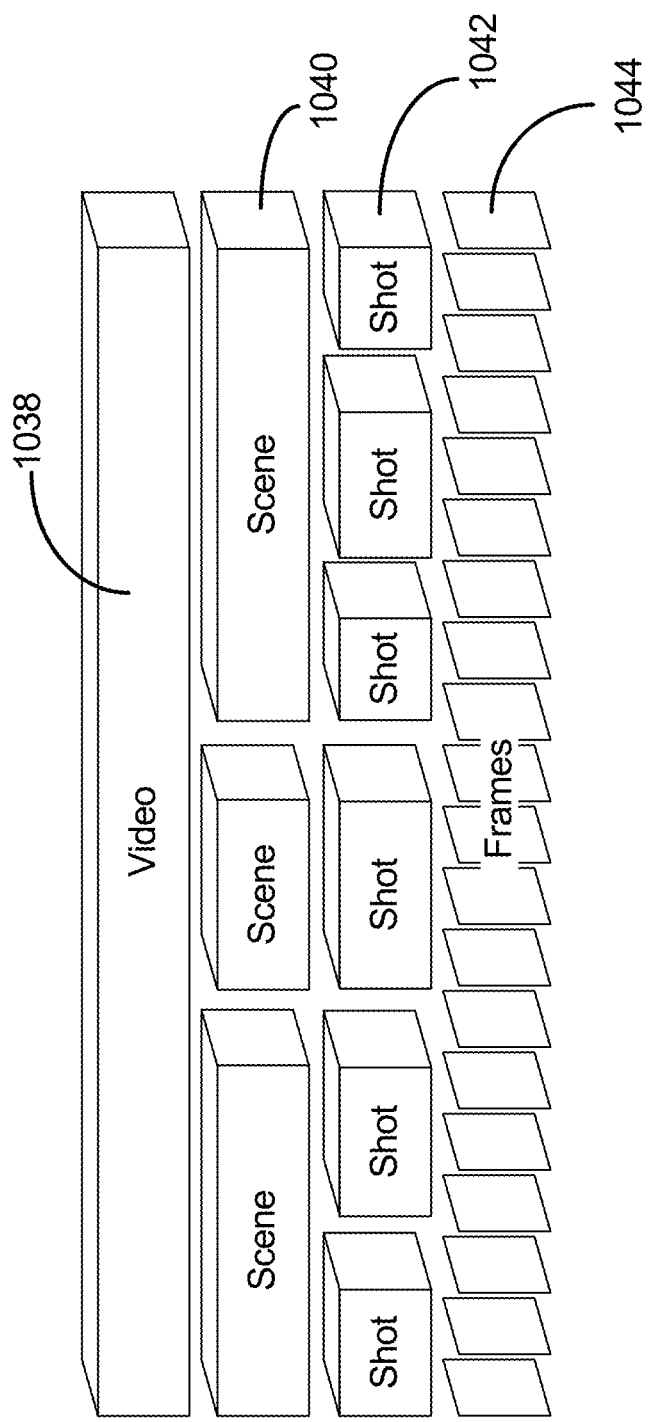
FIG. 5 illustrates a diagram of the formation of video content that may be used as part of a system for generating and providing on-demand interactive content to an audience.

FIG. 5 illustrates an example of the breakdown of video content that can be obtained via video camera 32. A video 1038 can be broken down into scenes 1040. Scenes 1040 can be broken down into shots 1042. Shots can be broken down into frames 1044. Each frame may be edited individually or as a group. FIG. 5 is exemplary and is not intended to be to scale of the number of frames that are in a single shot.

In the example shown, it is noted that objects may appear in one or more frames, shots, or scenes. For example, a particular object may appear during a portion of two scenes, in a subset of shots taken during those scenes, and in a specified set of frames. Video editing software may automatically identify that object, match the object to a particular product, and, upon confirmation by a user, display specified tag information (e.g., product information) either during the display of the object, during the scene or shot in which the object is displayed, or through some other portion (or all) of the video 1038. Such timing may be defined in the content enrichment data 130 described above.

Figure 6:
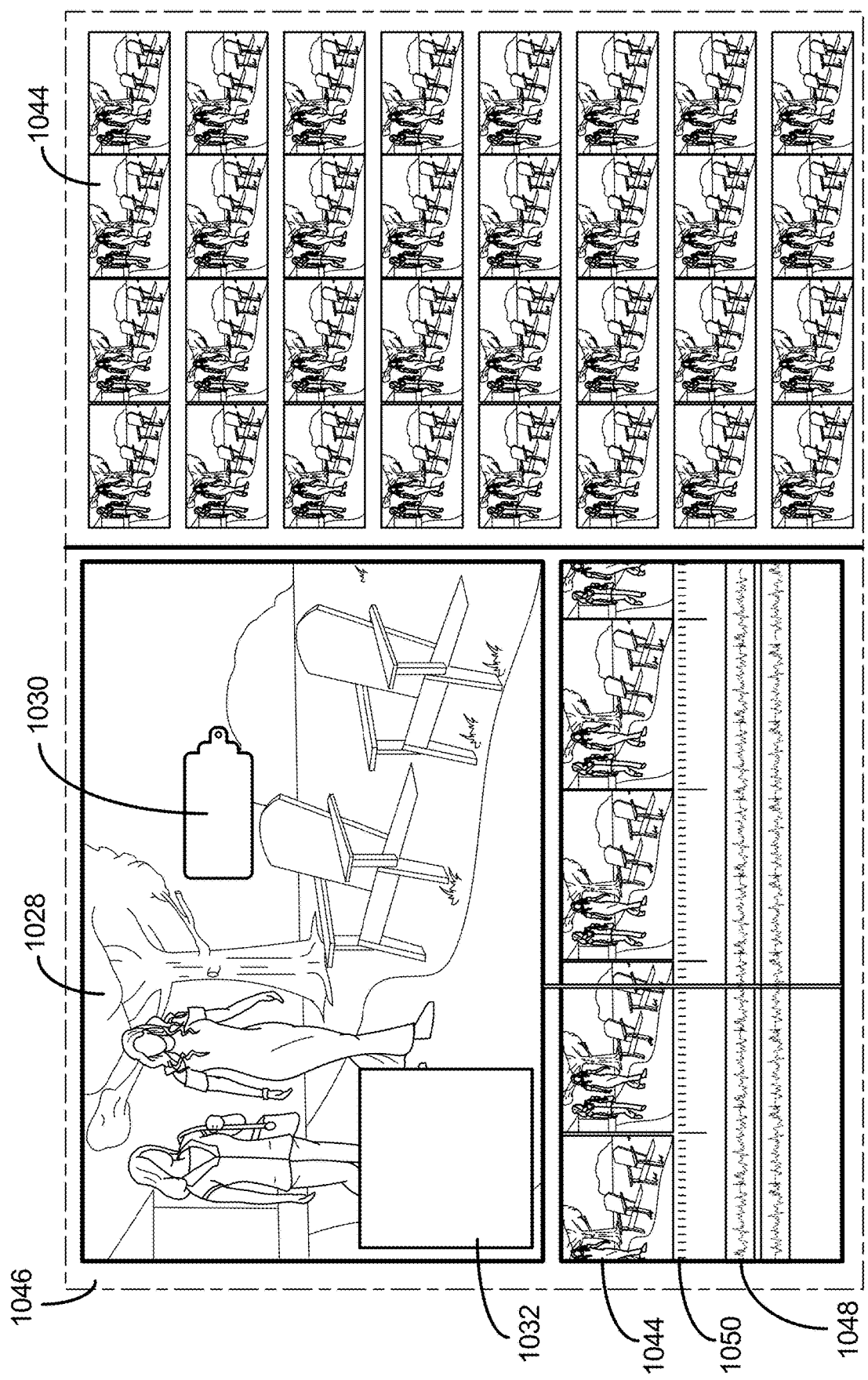
FIG. 6 illustrates a production management system for producing on-demand interactive content that can be shown to an audience.

FIG. 6 illustrates an example of video editing software 1046 that can be used to edit video data 1028. In the example shown, product data 1030 and advertising data 1032 may be associated with the video data 1028 for concurrent display during playback of the video data on one or more user devices. Content enrichment data 130 can be edited into the video data 1028 such as product data 1032, advertising data audio data 1048. The video editing software 1046 displayed in FIG. 6 can be used to edit the frames 1044 of the video data 1028 in a manner to add content enrichment data 130. In the embodiment shown, product data 1032 in the form of a product tag is added to the video data 1028. Audio data 1048 is added to the video data 1028. Advertising data 1032 is added to the video data 1028 in the form of an advertisement that appears in the lower left corner of the display. One or more frames may be edited in such a manner to include the content enrichment data on the screen for a specified amount of time. Addition of such content enrichment data can be done in an at least partially automated manner, e.g., by automatically identifying objects in the video data, and correlating those objects to products and or advertisements previously stored in the product and advertisement databases 1010, 1012 respectively.

Figure 7:
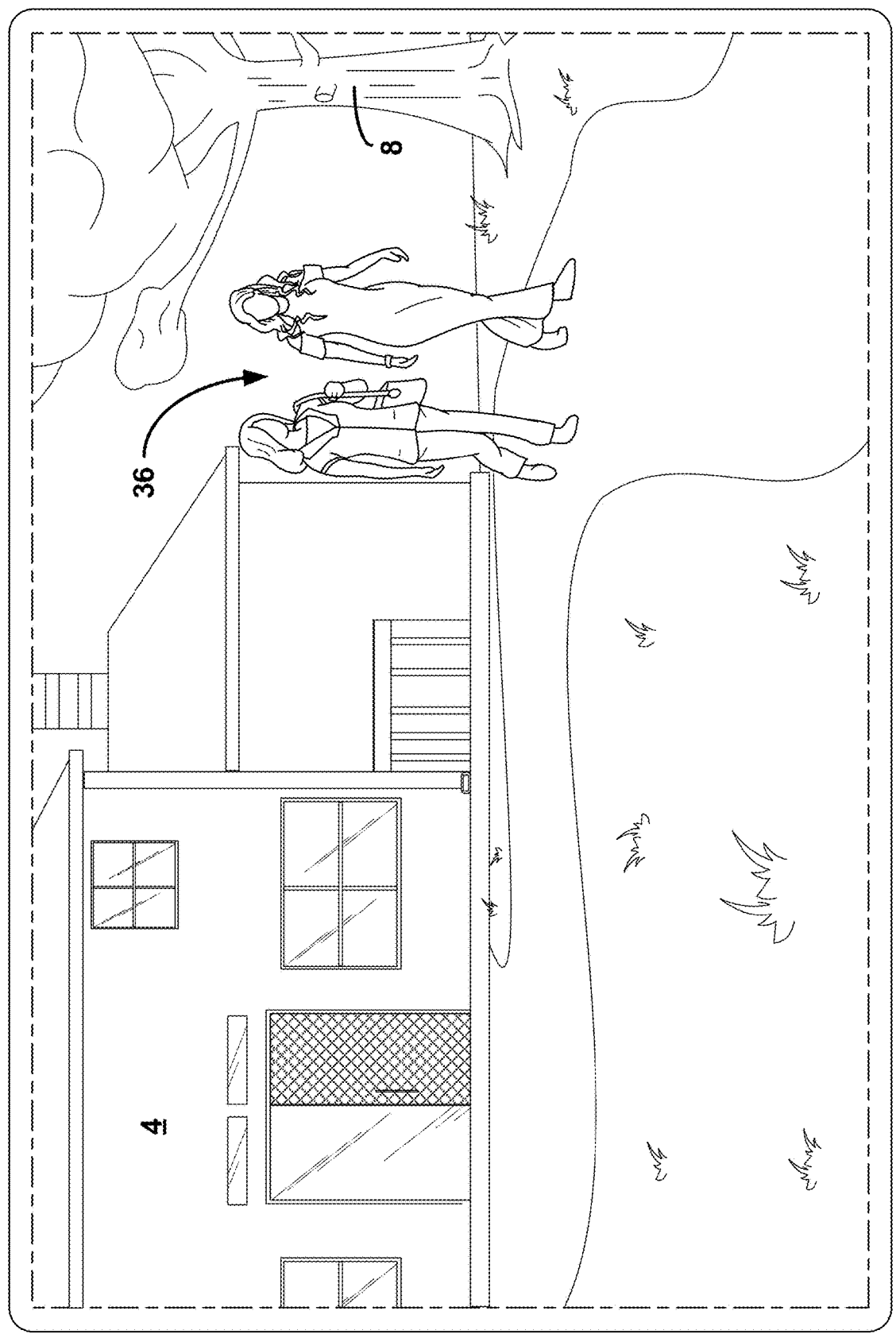
FIG. 7 illustrates a first scene produced as part of on-demand interactive content and depicts that scene being shown via an interactive device.
Figure 8:
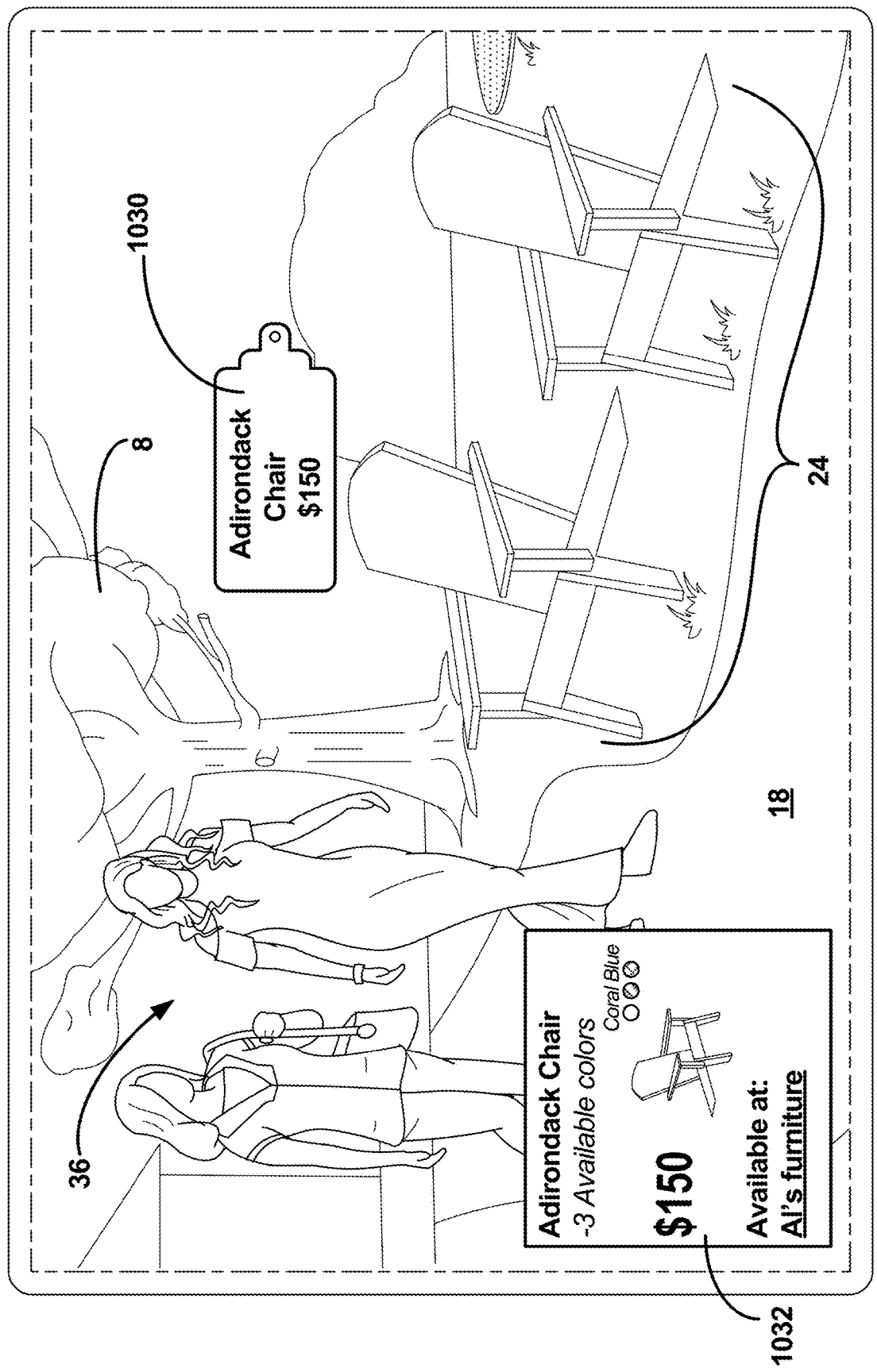
FIG. 8 illustrates a second scene produced as part of on-demand interactive content and depicts that scene being shown via an interactive device together with overlay content.

FIGS. 7-10 illustrate the addition of content enrichment data 130 to video data 1028. Each of FIGS. 7-10 represents a single frame of the video data 1028. FIG. 7 represents a first frame of video data 1028 wherein there are no objects. FIG. 8 is a second frame that includes the cast 36 walking toward chairs 24. In the embodiment, the chairs 24 are displayed together with product data in the form of a tag on the screen. The chairs 24 are also displayed with the advertisement 1032 related to the chairs 24.

Figure 9:
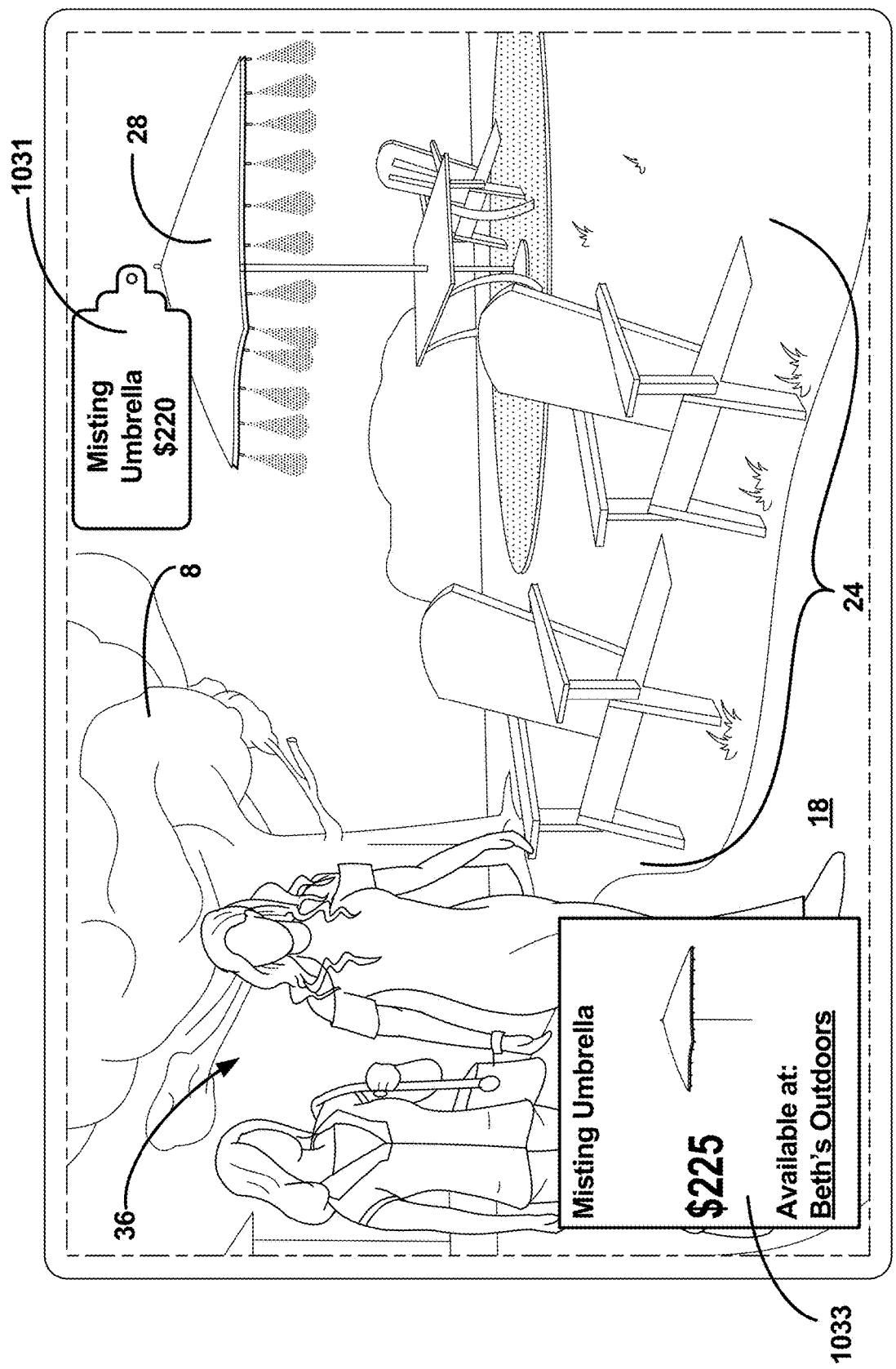
FIG. 9 illustrates a third scene produced as part of on-demand interactive content and depicts that scene being shown via an interactive device together with overlay content

FIG. 9 represents a third frame that includes the cast 36 continuing to walk in the scene past the chairs 24. As the cast 36 walks past the chairs 24, the misting umbrella 28 comes into view. As the misting umbrella 28 comes into view, product data 1031 related to the misting umbrella is displayed on the screen together with the misting umbrella 1031. Advertising data 1033 is also displayed relative to the object in the screen, in this case the misting umbrella 28.

Figure 10:
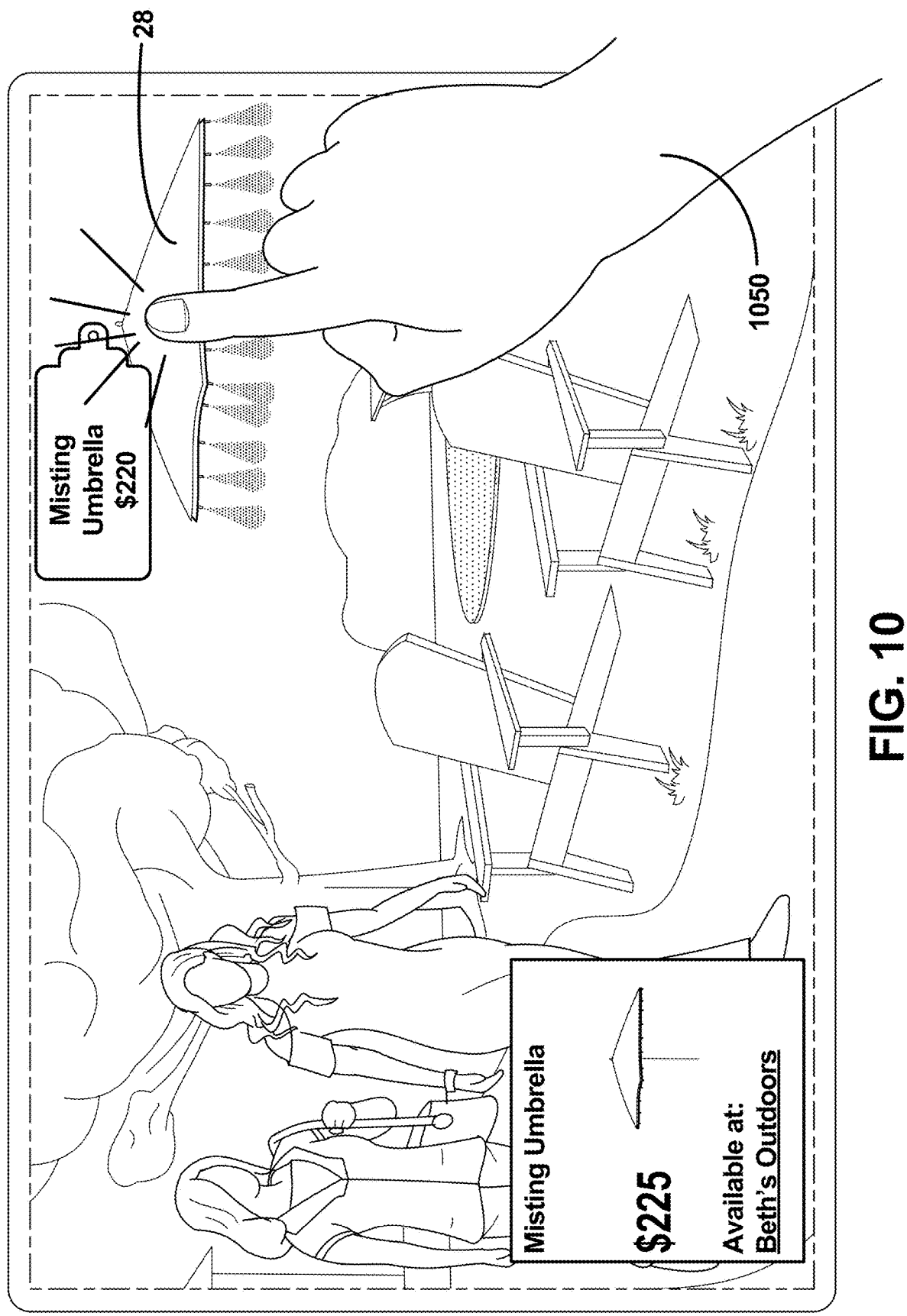
FIG. 10 illustrates a scene produced as part of on-demand interactive content and depicts that scene being shown via an interactive device together with overlay content and the selection of a product offered for sale via the interactive content.

FIG. 10 illustrates the hand 1050 of a user of the interactive device selecting the misting umbrella 28 for purchase. Upon selection, the user may automatically purchase the misting umbrella 28. The user may also modify the settings of the system to allow the user to be transferred to a website or other ecommerce platform to learn additional information about the product and to make the purchase of the product from the website or other ecommerce platform. Other options to initiate a purchase of an object include using a purchase code that is provided on screen, use an app to purchase the object that is live on the screen, or bring up a new screen on the interactive device to make a purchase, which may optionally automatically pause the video playback. These examples are not meant to be exhaustive and one can understand there may be other methods to initiate the purchase of a product. Users also may use various forms to engage a purchase, including clicking, swiping, touching, using audible sounds, or using a separate device to engage the purchase.

While the embodiment uses certain objects such as chairs 24 and the misting umbrella 28 to illustrate objects that may be purchased, any number of objects may be subject to purchase. These may include food items that are shown on screen and upon selection may engage a delivery service to deliver the items on screen. Selection of a food item may also provide product data related to recipes associated with the food, which may be delivered to the user upon selection of the food item.

It should be understood that the playback of the enhanced video data can be transmitted on a tape delay, streaming service, live or any other playback system. Additionally, the enhanced video data may include video data and associated content enrichment data, or may be enriched video data with such enrichment (e.g., tags, advertisements, etc.) built into the video data stream.

It should also be understood that a user may interact with the enhanced video data, including moving the enhanced video data forward, reverse, zoom in, zoom out, and pause. Another option is to active all product data for objects on the screen when the pause button is activated.

Figure 11:
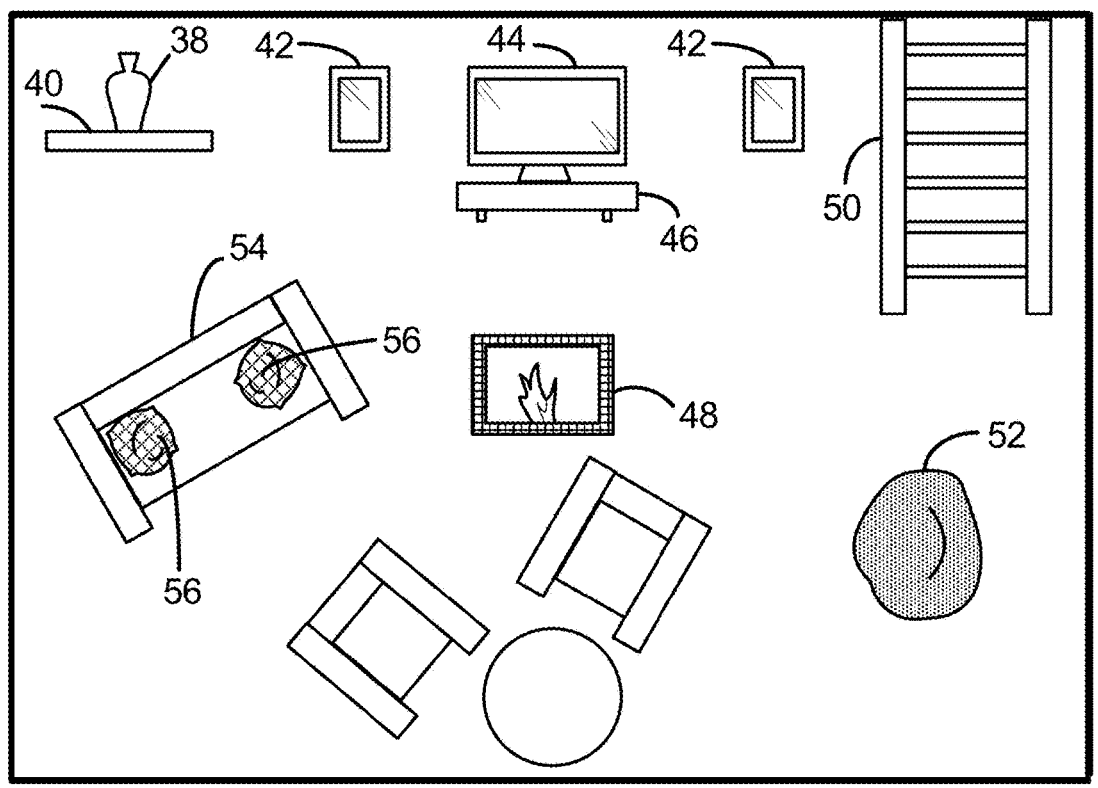
FIG. 11 illustrates one embodiment wherein the objects in the environment are recognized using photo capture technology.
Figure 11:
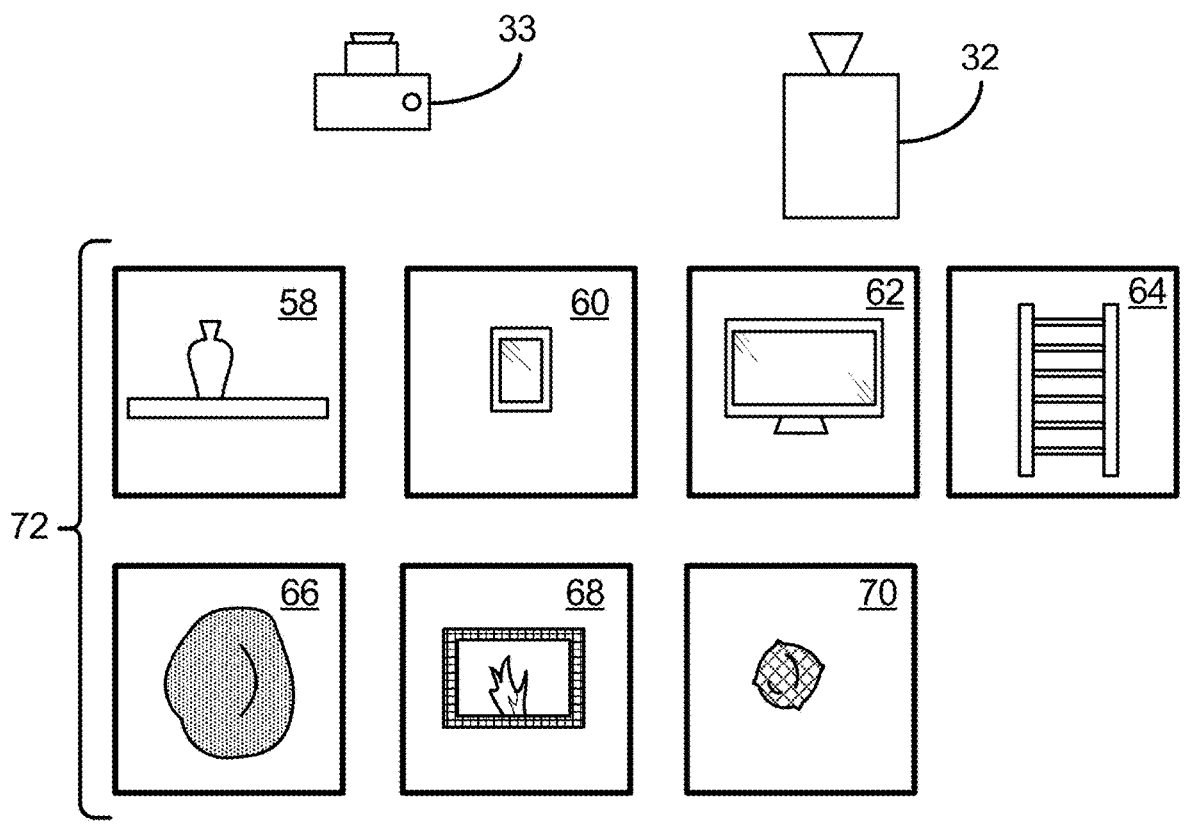

FIG. 11 illustrates one embodiment wherein the objects in the environment are recognized using photo capture technology. A video camera 32 or still shot camera 33 may be used to capture images of the objects in an environment. By way of example, objects in FIG. 11 include a vase 38 on a shelf 40, a frame 42, a television 44, a mantle 46, a fireplace 48, a book shelf 50, a bean bag 52, a couch 54, and a pillow 56. FIG. 3 shows the option of using a video camera 32 or a still shot camera 33 to take still video or photographs of the objects. While two examples of a video camera 32 and still shot camera 33 are used, any device capable of capturing a photo, frame of video, or visual representation of an object may be used. In one embodiment, the still shot camera 33 takes a photo of each of the objects. In FIG. 3, a photo of the vase 38 on a shelf 40 is depicted in a vase photo 58. A photo of the frame 60 is depicted in a frame photo 60. A photo of the television 44 is depicted in a television photo 62. A photo of the book shelf 50 is depicted in a book shelf photo 64. A photo of the beanbag 52 is depicted in a beanbag photo 66.

A photo of the fireplace 48 is depicted in the fireplace photo 68. A photo of the pillow 56 is depicted in the pillow photo 70. Any number of objects can be placed in the environment and may be the subject of photographs. The photographs 72 may be stored in the product database 1010 as shown in FIG. 3. Additionally, available image recognition technologies may be utilized to correlate the objects in the photographs to the same or similar objects appearing in the video data, thereby allowing for automatic recognition of the objects within portions of the video data, on a frame by frame basis.

Figure 12:
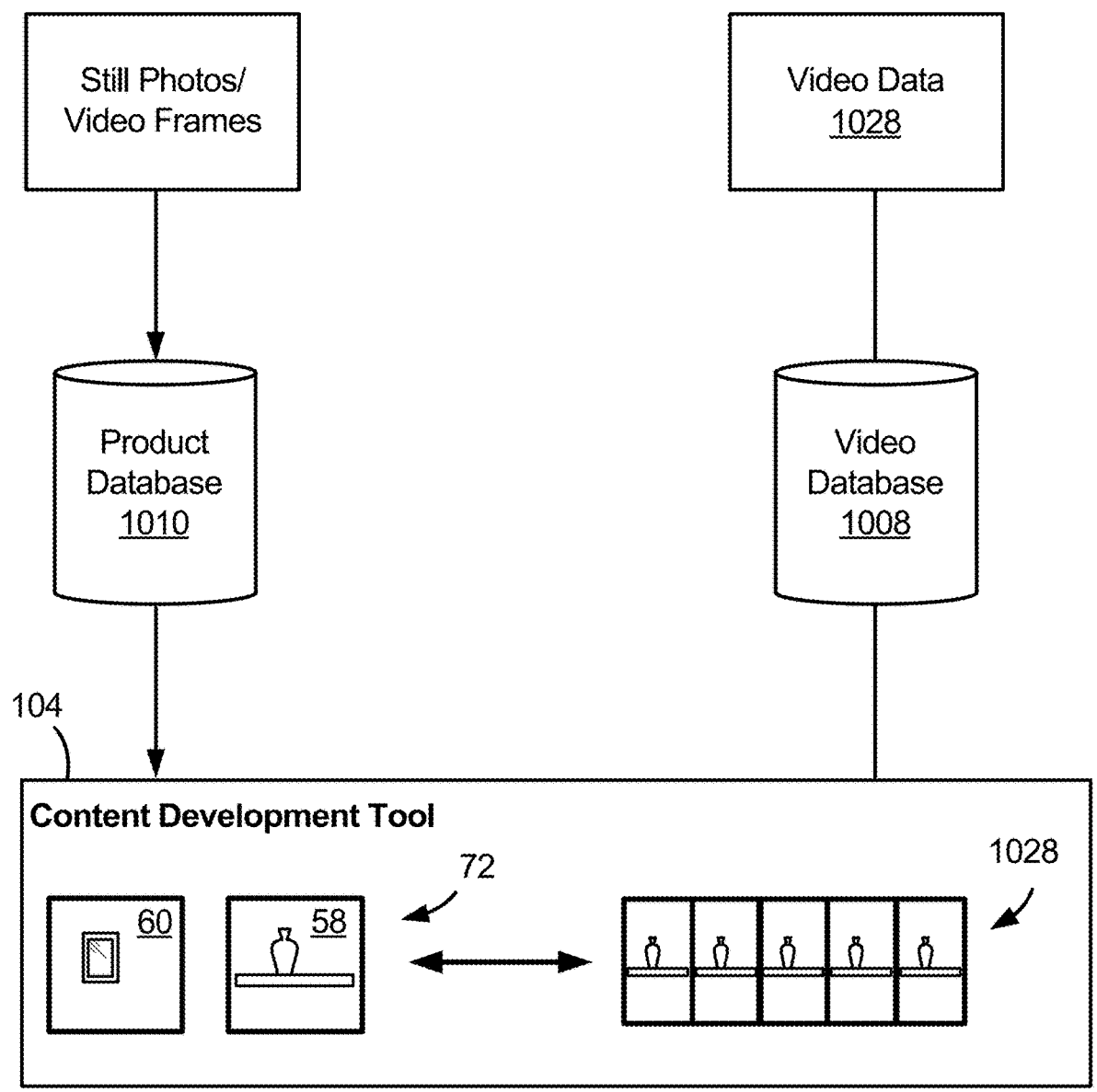
FIG. 12 illustrates an example methodology for identification of objects within video data using photographs, as described in conjunction with FIG. 11.

FIG. 12 illustrates the identification of objects within video data 1028 using the photographs 72 described in FIG. 11. The photographs 72 are stored in the product database 1010. A computer system 104 as set forth in FIG. 2 may be used to process the video data 1028 stored in the video database 1008 and identify the frames in which each object subject to the photographs 72 appears. The computer system will identify the specific location in each frame where the object appears based on image identification technology. That location in the video is recorded in the product database 1010. Other product information related to the object is also located in the product database 1010 including a product heading, description of the product, and product cost. Other information may also be included (e.g., in a tag or other overlay of information on the video data as included in the content enrichment data).

Figure 13:
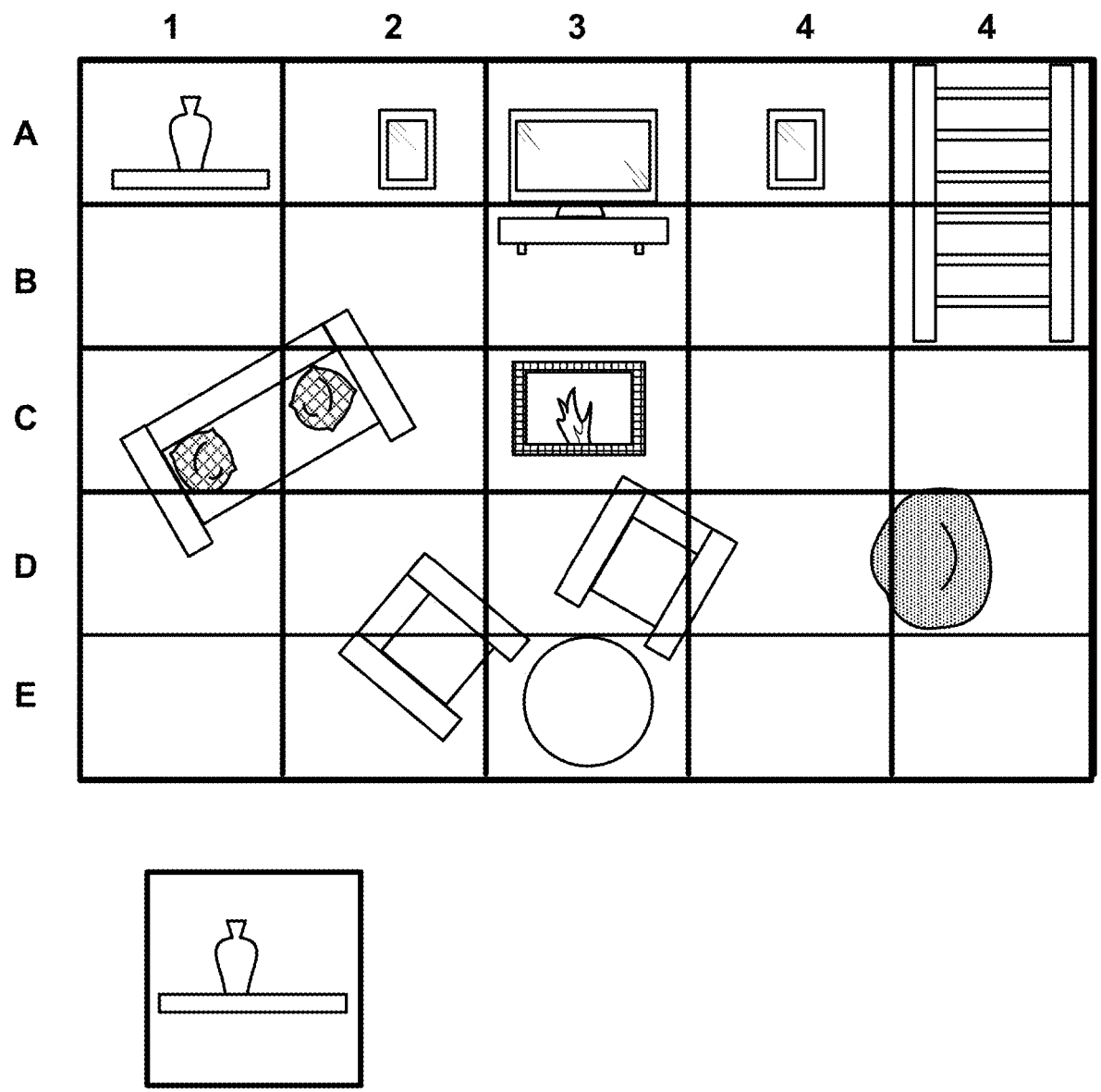
FIG. 13 illustrates another embodiment for identification of objects within video data using photograph using a grid layout, as compared to the embodiment discussed in conjunction with FIG. 12.

FIG. 13 illustrates another embodiment using a grid layout. The grid layout is separated into horizontal and vertical grids. An object within the grid is set forth in one or more portions of the grid pattern. An object may overlap a single portion of the grid. The object location according to the grid is stored in the product database 1010 and is used to associate product data with a particular object within a particular location within a frame.

In the ecommerce solutions described herein, the object that appears online may be available for purchase. There are scenarios where a product is sold out or no longer available. In those circumstances, replacement products may be made available. One embodiment is to identify alternative or replacement options in the product data. When a product is sold out, the replacement product is made available in its place. This may be used in connection with on screen purchases as well together with an optional note.

Figure 14:
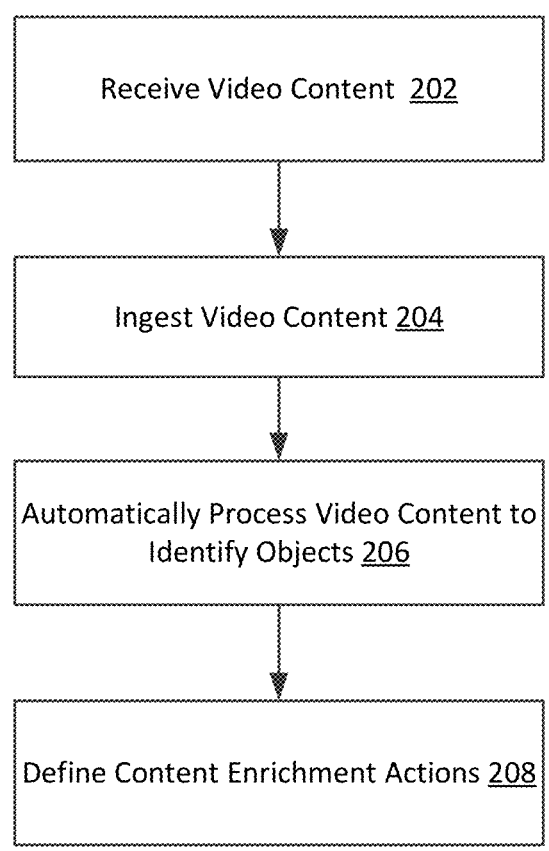
FIG. 14 shows a general flowchart of a method of receiving and processing program content for enrichment and playback, in accordance with example aspects of the present disclosure.
Figure 14:

FIG. 14 shows a general flowchart of a method 200 of receiving and processing program content for enrichment and playback, in accordance with example aspects of the present disclosure. In the embodiment shown, the method 200 includes receiving captured video content (step 202). Receiving captured video content can include, for example, video content displaying a plurality of scenes, the plurality of scenes displaying a cast and one or more objects included in one or more of the scenes.

In the embodiment shown, the method 200 includes ingesting the video content into a content database (step 204). Once in the content database, the video content may be processed to automatically identify one or more objects that are displayed in one or more scenes of the video content (step 206). This can include, for example, use of one or more commercially available object recognition technologies, such as Vision AI, from Google. Other object recognition technologies may be used as well. Once objects are recognized, those objects may be automatically correlated to one or more products that are known to the content of server. The products can be, for example, products having product information stored in a product database, or having product information stored in an e-commerce server accessible from the content server.

In the embodiment shown, the method 200 further includes defining one or more content enrichment actions that may be performed during playback of the content when the content is requested and playback by a user device (step 208). The one or more content enrichment actions can include, for example, generation of an overlay that provides product details of the product that is associated with the object. In other examples, the one or more content enrichment actions can include display of one or more advertisements associated with the object or a product related to the object.

In example embodiments, the overlay may be defined as a tag which is displayed over the video content in the vicinity of the object while the object appears in the video content during playback. In other examples, the overlay may be text (e.g., subtitles or other overlay text) which otherwise provides supplemental information to a viewer who may wish to learn more about a topic of conversation occurring in the video content by or among the cast. Such content enrichment actions may be defined by a user having video editing tools, as discussed above. The user may be prompted to define such content enrichment actions upon the content development tool 112 automatically identifying objects having matched products or advertisements.

Figure 15:
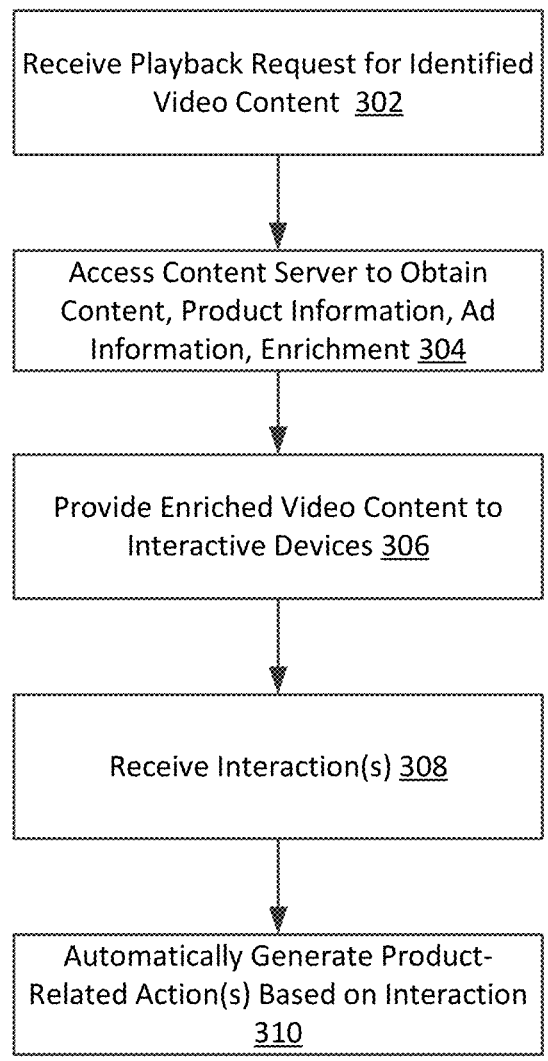
FIG. 15 shows a general flowchart of a method of interacting with enriched video content in accordance with the methods and systems described herein.

FIG. 15 shows a general flowchart of a method 300 of interacting with enriched video content in accordance with the methods and systems described herein. The method 300 may be initiated by an interactive user device, such as any of the devices previously described in conjunction with FIG. 3.

In the embodiment shown, the method 300 includes receiving a request from an interactive user device for playback of video content (step 302). The request may be received at an application server and forwarded to a content server (e.g., for receipt by a customer API 118 of content development tool 112). In response to the request, the method 300 may further include obtaining the requested video content, alongside related product information, and optionally advertisement information (step 304). A content feed may be generated and provided to an interactive user device that includes not only the original video content, but additionally the content enrichment actions, to provide enriched video content (step 306). This can include, for example, displaying an option to purchase a product corresponding to an object while that object is displayed during playback of the video content. It can also include displaying an advertisement associated with an object while the object is displayed during playback. Still further, displaying enriched video content may include displaying an advertisement associated with a topic of conversation while that topic of conversation is addressed during the programming reflected in the video content. For example, the topic of conversation may be a topic addressed during a talk show. The advertisement, or product information, may be displayed as an overlay, for example a tag, displayed over a portion of the video content.

Still further, in the method 300, one or more interactions may be received from a in the interactive user device (step 308). The interactions may include, for example, a selection of a tag or overlay or advertisement relating to a particular product that was previously automatically identified as being related to an object appearing in the video content. In accordance with the present disclosure, interactions may be provided by a user in various forms, for example using touch, gesture, voice activation, cursor, or other types of selections for objects within a graphical interface displaying an audiovisual presentation (e.g., of the enriched video content).

In response to the received interactions, the method of 300 may further include automatically generating one or more product related actions based on the interaction (step 310). The product related interactions may include, for example, automatically generating and forwarding a request to purchase a product associated with the object to an e-commerce server. The product related interactions may also include displaying supplemental information about a product in response to user selection of the product, display of one or more advertisements or promotions associated with a product, or other similar actions.

Referring now to FIGS. 1-15 generally, it is noted that the present application has a number of advantages over existing television-based, video-based, or static online retail systems. For example, as compared to existing static product display web sites and television based shopping experiences, the present application allows user interaction with video content to allow the user to discover products through that user's own curiosity without making the object or product or advertisement the focal point of the video content. Accordingly, users will be more likely to investigate products on their own since the video content will address the topic of interest and the product information can be presented in a way that is subsidiary to the topic of discussion occurring during the video content. Therefore, the user's interest is retained for a longer period of time, allowing more objects, and therefore more products and advertisements, to be displayed to the user.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features.

Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A system for generating and providing on-demand interactive content to an audience, the system comprising:
a content server including a processor and a memory, the memory hosting a content database, a product database, and an advertising database, the memory further storing instructions which, when executed, cause the content server to:
receive video content, the video content including a talk show having a plurality of scenes, each of the scenes including a host, one or more guests, and a plurality of objects, wherein a wired or wireless transmitter is associated with each of the plurality of objects, the wired or wireless transmitter being capable of sending signals to at least one video camera having at least one receiver to receive transmissions;
ingest the video content into the content database;
process the video content to automatically identify an object of the plurality of objects as associated with a product having an associated product record in the product database without a requirement of prior product identification by an individual;
automatically identify a plurality of frames within the video content based, at least in part, on a proximity of the host and/or the one or more guests to the object and the object appearing in the video content, wherein an electronic device indicating a location of the object is used to determine the proximity to the object is determined when the object is visible in a plurality of frames; and
define one or more content enrichment actions to be performed during playback of the video content, the one or more content enrichment actions including generating an overlay providing product details of the product during playback of the plurality of frames based on information about the product in the product database, the overlay being displayed in association with the video content during playback of a portion of the video content during which the object appears; and
an application server communicatively connected to the content server and configured to execute instructions which cause the application server to perform:
receive a request from an interactive user device for playback of the video content;
in response to the request, obtaining content, product information, and
advertisement information from the content server; and
generate a content feed to the interactive user device, wherein the content feed provides playback of the video content and allows interaction with the content feed during playback of the plurality of frames of the video content based on the one or more content enrichment actions.

2. The system of claim 1, wherein at least one content enrichment action includes presenting to a user an option to purchase the product associated with the object from a retailer.

3. The system of claim 2, wherein the retailer comprises an online retailer.

4. The system of claim 2, wherein the at least one content enrichment action includes presenting to the user a link to the product associated with the object, the link being to an online retail website.

5. The system of claim 1, wherein each of the plurality of objects is associated with at least one of a product and an advertisement.

6. The system of claim 1, wherein the product details are included in product information and the overlay comprises a tag displayed in association with the object, the overlay being defined within content enrichment data that is generated during processing of the video content and which defines the one or more content enrichment actions.

7. The system of claim 1, wherein the content server is further configured to define one or more advertisements to be displayed in association with the video content during playback of at least a portion of the video content.

8. The system of claim 1, further comprising at least one interactive user device communicatively connected to the content server and the application server, the at least one interactive user device having software thereon capable of playback of the content feed.

9. The system of claim 8, wherein the content feed comprises enriched video content.

10. The system of claim 8, wherein the at least one interactive user device is selected from the group of devices consisting of: a television, a set-top box, a phone, a tablet, and a portable computing system.

11. The system of claim 8, wherein the at least one interactive user device comprises a touch screen device, and wherein, in response to user selection of a tag associated with an object displayed during playback of the video content and displayed as one of the one or more content enrichment actions, the user is presented with an option to purchase the product associated with the object.

12. The system of claim 11, wherein, in response to user selection of the tag, an automated purchase request is transmitted from at least one of the interactive user device, the application server, and the content server to an e-commerce server.

13. The system of claim 1, wherein image identification technology identifies the location of the object and a location of the host and/or one or more guests when the object and the host and/or one or more guest are visible within the plurality of frames.

14. The system of claim 1, wherein electronic transmitting tags are placed on the host and/or the one or more guests and the object, and the proximity is determined by a distance between the respective tags.

15. The system of claim 12, wherein at least one of a host or one or more guests and the plurality of objects are outfitted with electronic transmitting tags.

16. The system of claim 15, wherein, when an individual comes within a certain distance of an object, the electronic transmitting tags communicate with the interactive user device and record a time stamp of the video content.

17. The system of claim 16, wherein the location of the object on frame is determined when the video camera detects the object is within the plurality of frames by receiving a signal from the wired or wireless transmitter.

* * * * *